(12) United States Patent
Cagides

(10) Patent No.: US 9,126,268 B2
(45) Date of Patent: Sep. 8, 2015

(54) FLYWHEEL RECONDITIONING TOOL

(71) Applicant: Jose Antonio Cagides, Hialeah, FL (US)

(72) Inventor: Jose Antonio Cagides, Hialeah, FL (US)

(*) Notice: Subject to any disclaimer, the term of this patent is extended or adjusted under 35 U.S.C. 154(b) by 48 days.

(21) Appl. No.: 14/011,120

(22) Filed: Aug. 27, 2013

(65) Prior Publication Data

US 2015/0059540 A1 Mar. 5, 2015

(51) Int. Cl.
*B23B 5/28* (2006.01)
*B23B 29/04* (2006.01)

(52) U.S. Cl.
CPC . *B23B 29/04* (2013.01); *B23B 5/28* (2013.01); *B23B 2222/84* (2013.01); *B23B 2226/31* (2013.01); *B23B 2260/004* (2013.01); *B23B 2260/124* (2013.01); *B23B 2260/138* (2013.01); *Y10T 82/21* (2015.01); *Y10T 82/2512* (2015.01)

(58) Field of Classification Search
CPC ........ B23B 29/04; B23B 29/06; B23B 29/08; B23B 29/10
USPC .................. 82/158, 161, 159, 160, 123, 112; 142/56, 49; 407/73, 75, 76, 92, 97, 93, 407/105, 106, 107, 108
See application file for complete search history.

(56) References Cited

U.S. PATENT DOCUMENTS

| 908,804 | A | * | 1/1909 | Rhoades | 82/161 |
| 3,813,970 | A | * | 6/1974 | Mitchell | 82/158 |
| 5,063,799 | A | * | 11/1991 | Brewer | 82/158 |
| 6,419,427 | B1 | * | 7/2002 | Galamba et al. | 409/131 |

* cited by examiner

*Primary Examiner* — Sunil K Singh
*Assistant Examiner* — Alan Snyder
(74) *Attorney, Agent, or Firm* — Ruben Alcoba, Esq.

(57) ABSTRACT

A lathe tool that works in conjunction with a HUNTER lathe to engage a rotating an inner frictional surface of a flywheel on its axis to perform various symmetrical operations about an axis of rotation such as cutting and facing with a cutting tool. The components of the lathe tool position to one side of the flywheel to allow sufficient clearance for engaging a large flywheel across the full diameter of the flywheel, and also provide adjustment mechanisms for enhanced precision. A lathe mount extends perpendicularly from the Hunter lathe terminating at a lathe mount aperture. A tool mount passes through the lathe mount aperture terminating at a cutting tool notch, where the cutting tool attaches. A bracket passes through the tool mount and includes an adjustable screw that extends towards the Hunter lathe, rotating to draw the lathe tool to and from the flywheel.

3 Claims, 3 Drawing Sheets

FLYWHEEL RECONDITIONING TOOL

BACKGROUND

The present invention is related to a lathe tool that is configured to allow sufficient clearance for engaging a flywheel with a large diameter.

It is well known that a flywheel is a rotating mechanical device that is used to store rotational energy. Flywheels have a significant moment of inertia and thus resist changes in rotational speed. The amount of energy stored in a flywheel is proportional to the square of its rotational speed. Energy is transferred to a flywheel by applying torque to it, thereby increasing its rotational speed, and hence its stored energy. A flywheel utilizes one side for engaging a clutch plate. This frictional contact surface often goes through much wear and tear along with oxidation degradation.

It is common or flywheels to accumulate surface rust, debris, and other forms of oxidation during their lifetime. Though, for clutch flywheels, only one side needs to be resurfaced. Resurfacing the flywheel includes removing a thin layer of metal from the surface, and often applying an antirust composition. Additionally, a warped or unsymmetrical flywheel can be reworked to provide a planar surface sufficient for operation. A lathe is often used to resurface the damaged side of the flywheel, rotating the flywheel on an axis as the corrupted surface engages a hard cutting tool.

Often, a lathe is a machine tool which rotates the fly wheel on its axis to perform various operations such as cutting, sanding, knurling, drilling, or deformation, facing, turning, with tools that are applied to the flywheel to create an object which has symmetry about an axis of rotation. The lathe often has a U-shaped clamp where a cutting tool attaches. This configuration allows the work piece to be resurfaced from both sides simultaneously.

In many cases, the configuration of the U-shaped clamp restricts the cutting tool from engaging along the full diameter of the flywheel, from the hub to the perimeter. This is especially the case with larger flywheels having a 24" diameter and larger. Since flywheels only require resurfacing one side, the U-shaped clamp that resurfaces both sides simultaneously may be unnecessary.

Lathe tools have been used in the machining industry in the past, yet none with the present characteristics of the present invention. See U.S. Patent No. 20130036880; U.S. Pat. No. 8,336,430; and U.S. Pat. No. 5,224,529.

For the foregoing reasons, there is a need for a lathe tool that can resurface the worn or oxidized portion of a flywheel.

SUMMARY

The present invention is directed to a lathe tool that is configured to work in conjunction with a brake lathe, the present invention work optimally on a HUNTER brake lathe. In one embodiment, the lathe tool engages a rotating flywheel on its axis to perform various symmetrical operations about an axis of rotation such as cutting, sanding, knurling, drilling, deformation, and facing with a cutting tool that is applied to an inner frictional surface of the flywheel. The lathe tool is configured to provide sufficient clearance for engaging larger flywheels across the full diameter of the flywheel, and also providing numerous adjustment mechanisms for enhanced precision.

In some embodiments, the lathe tool is configured and oriented to fully engage an inner frictional surface of the flywheel, extending from a flywheel hub to a flywheel perimeter, with minimal inhibition. The lathe tool extends perpendicularly from the HUNTER lathe, orienting laterally and adjacent to the inner frictional surface of the flywheel. Conversely, the outer surface of the flywheel does not engage the lathe tool. In this manner, the lathe tool may adjust in a variety of planes along the inner frictional surface to position the axial position of the lathe tool relative to, and in engagement with any point along the diameter of the inner frictional surface. This configuration allows the lathe tool to engage larger flywheels without stopping the lathing operation to reposition the flywheel on a lathe spindle. Further, numerous adjustable components that work in conjunction with the Hunter lathe allow the lathe tool to better control the depth to which the inner frictional surface is abraded.

In one embodiment of the present invention, the lathe tool includes a lathe mount disposed to extend perpendicularly to a main axis of the Hunter lathe. The lathe mount may comprise a cylindrical shape. The lathe mount is disposed to extend perpendicularly to a main axis of a Hunter lathe, adjustably extending and retracting in relation to the Hunter lathe. In this manner, the lathe tool is operable to engage an inner frictional surface of the flywheel. Those skilled in the art will recognize that because the lathe mount positions on only one surface of the flywheel—the inner frictional surface—the lathe mount may fully engage the flywheel from a flywheel hub to a flywheel perimeter. This unhindered access to the flywheel, along with the adjustable features of the lathe tool allow for lathing operations on larger flywheels having a diameter of 24 inches and up to 36 inches.

In one embodiment, the lathe mount further comprises a lathe end for joining with the Hunter lathe. The lathe end may at least partially pass through an aperture in the Hunter lathe to form a secure attachment. In some embodiments, the lathe mount comprises a lathe mount slot, which is disposed to position along a longitudinal axis of the lathe mount. The lathe mount slot is configured to receive at least one adjustment pin from within the Hunter lathe; wherein rotational movement of the lathe mount is inhibited. In some embodiments, the lathe mount comprises a tool end. The tool end comprises a lathe mount aperture for receiving additional components of the lathe tool. The tool end further comprises at least one lathe mount adjustment aperture for allowing at least one adjustment pin to pass through. In this manner, rotational movement may be inhibited.

In one embodiment of the present invention, a bracket, which comprises a substantially annular shape, is configured to receive the lathe mount. The bracket forms a tight fit around the lathe mount, whereby the lathe mount and the bracket move in and out of the Hunter lathe in conjunction. In some embodiments, the bracket at least partially adjusts the position of the lathe mount in relation to the Hunter lathe. The bracket further comprises a protruding member. The protruding member comprises a bracket aperture for receiving a bracket rod. The bracket, which may include a screw, is configured to extend and retract through the bracket aperture for engaging a sidewall surface on the Hunter lathe. In this manner, the bracket rod may be rotated in a first direction to urge the bracket rod into engagement with the Hunter lathe causing the lathe mount to extend away from the Hunter lathe. Conversely, the bracket rod may be rotated in a second direction, causing the lathe mount to move inwardly, towards the Hunter lathe. In this manner, the position of the lathe mount in relation to the flywheel may be calibrated for more precise measurements.

In one embodiment of the present invention, the lathe tool comprises a tool mount that is configured to receive and secure a cutting tool for engaging the inner frictional surface. The tool mount is disposed to orient perpendicularly to the lathe mount by passing through the lathe mount aperture. In some embodiments, the tool mount comprises a tool mount slot, which is disposed to position along a longitudinal axis of the tool mount. The tool mount slot is configured to receive at least one adjustment pin for inhibiting rotation of the tool mount. In this manner, stability of the lathe tool may be enhanced during precision lathing operations. The tool mount further comprises a cutting end for joining with the cutting tool. The cutting end comprises a cutting tool notch, which is configured to at least partially receive the cutting tool. The cutting end further comprising at least one tool mount adjustment aperture for receiving the at least one adjustment pin. In this manner, the at least one adjustment pin applies a force on the cutting toot to form a more secure attachment in the tool notch. The tool mount further comprises a free end, which may be pushed or pulled to adjust lateral movement of the cutting tool with the inner frictional surface.

One novel lathe tool feature is the clearance that the lathe tool allows relation to the flywheel. Since the lathe tool positions solely on one side, the inner frictional surface of the flywheel, rather than forming a U-shaped configuration on both sides of the flywheel, larger flywheels may be engaged by the lathe tool. Nonetheless, either side of the flywheel, brake disc, or any other work piece may be operated on by removing the flywheel from the spindle and flipping to the opposite side.

Another novel feature of the present invention is the adjustability of the bracket that joins with the lathe mount. The bracket rod includes a screw that rotates through the bracket aperture to extend and retract the lathe mount in small increments. This minimal movement is conducive with the precision requirements of surfacing the face of a clutch flywheel.

An objective of the present invention is to surface the face of a flywheel or other friction disk to achieves a surface pattern that promotes proper wearing-in of the flywheel or disc.

In yet another objective, the time and labor required to surface the flywheel is reduced since the complete flywheel diameter, from the hub to the perimeter can be done in one operation without removing the flywheel from the lathe spindle.

DRAWINGS

These and other features, aspects, and advantages of the present invention will become better understood with regard to the following description, appended claims, and drawings where:

DESCRIPTION

Figure 1:
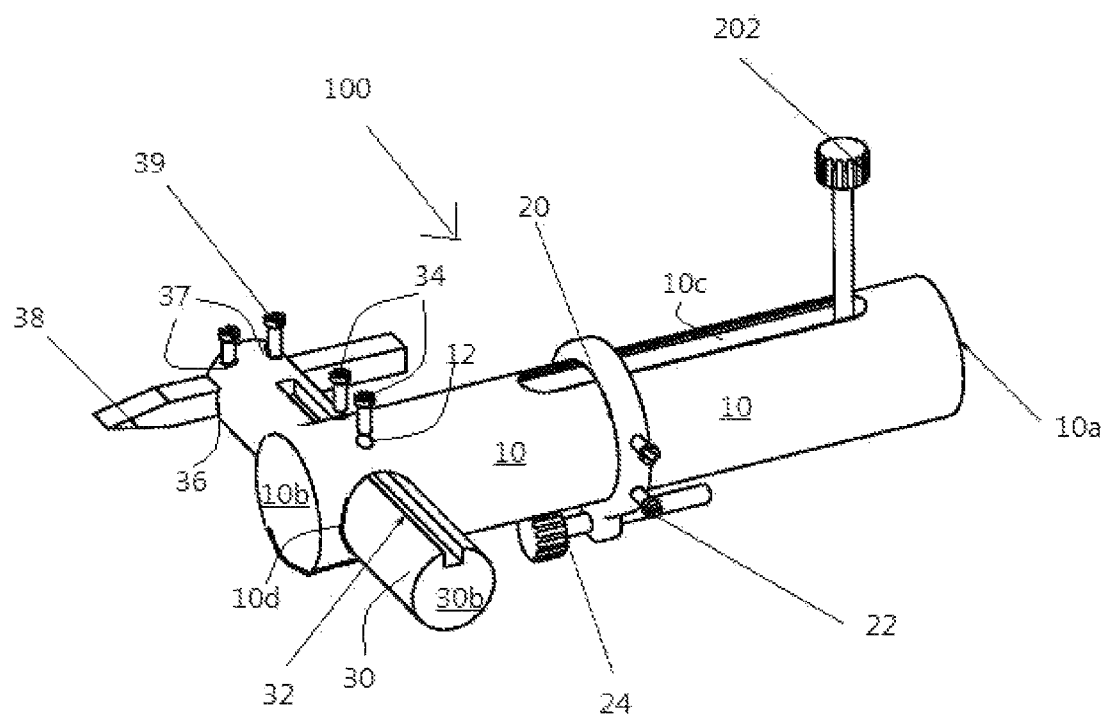
FIG. 1 is a detailed perspective view of the present invention showing an exemplary lathe tool.
Figure 2:
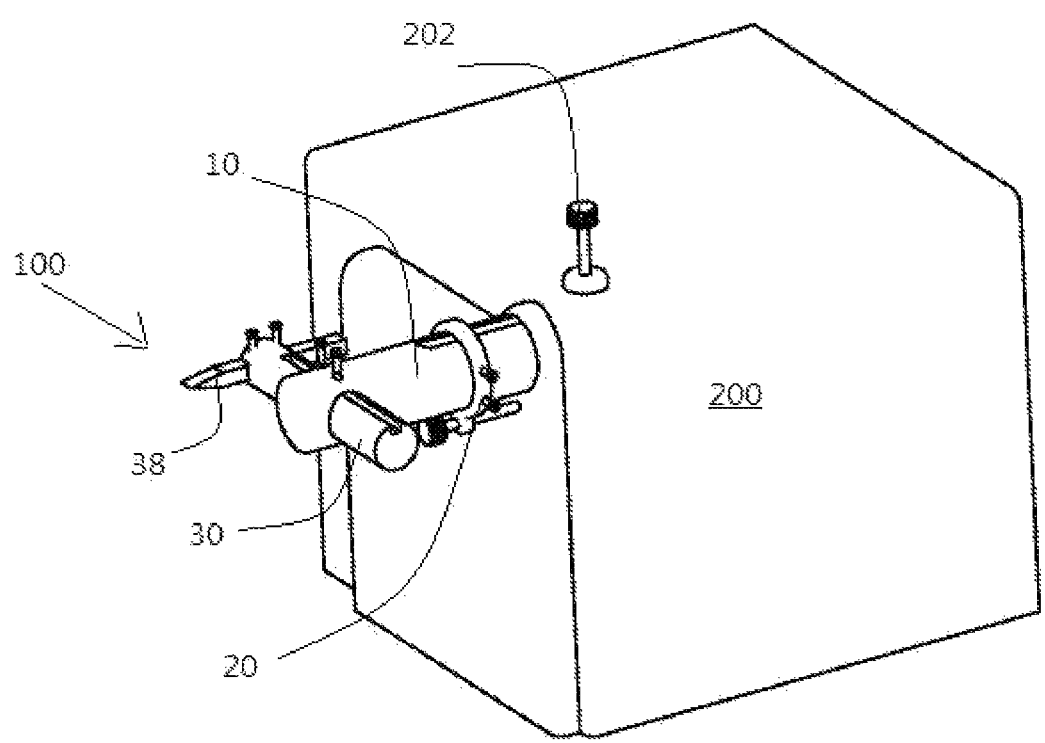
FIG. 2 is a detailed perspective view of the present invention showing an exemplary lathe tool joined with a HUNTER lathe.
Figure 3:
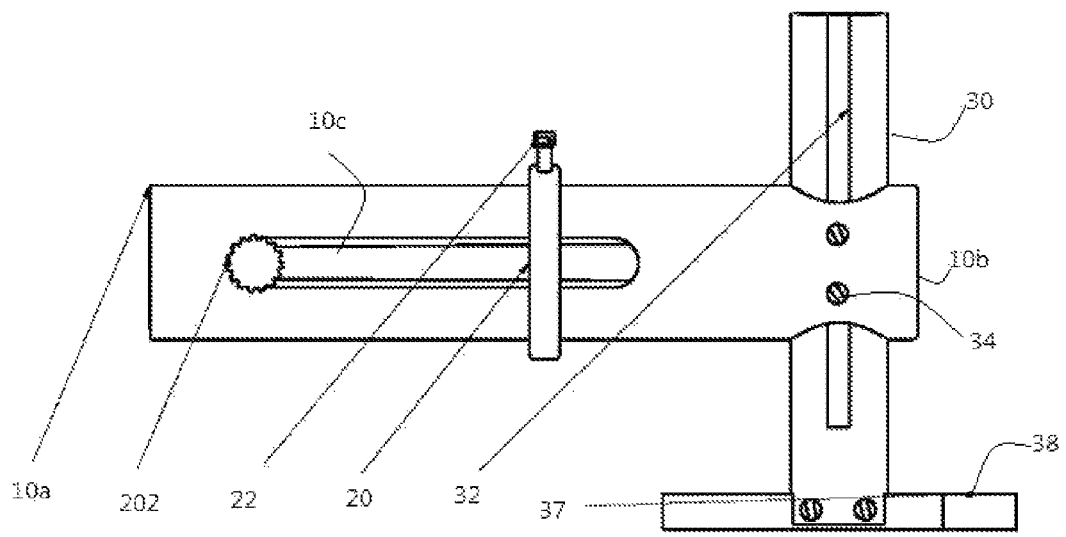
FIG. 3 is a top plan view of the present invention.

One embodiment of a flywheel reconditioning tool 100 of the present invention is illustrated in FIGS. 1 through 4. The flywheel reconditioning tool 100 that works in conjunction with a lathe 200 comprises of a lathe mount 10 that is cylindrical, the lathe mount 10 is inserted and secured to the lathe 200 via a lathe mount screw 202, the lathe mount 10 has a first 10a and a second end 10b, adjacent to the first end 10a a channel 10c is defined that runs along the length of the lathe mount 10 for a distance of at least 4.50 inches, and adjacent to the second end 10b a through hole 10d is defined, the through hole 10d runs perpendicular to the channel 10c, also adjacent to the second end 10b at least a pair of screw apertures 12 are defined, the screw apertures 12 are centrally lined up and run parallel to the through hole 10d; a bracket 20 that is mounted on the lathe mount 10 at a position that is adjacent to the first end of the lathe mount 10, the bracket 20 defining at least on securing tension screw 22 that secures the bracket 20 to the lathe mount 10 and an adjuster screw 24, the adjustor screw 24 runs parallel to the lathe mount 10 when the bracket 20 is mounted on the lathe mount 10; a tool mount 30, the tool mount 30 is cylindrical and has a first 30a, and a second end 30b, the tool mount 30 defines a channel 32 that runs along the length of the tool mount 30 and runs from the second end 30b toward the first end 30a, the first end 30a of the tool mount 30 is inserted and passed through the lathe mount through hole 10d and is secured to the lathe mount 10 by at least one tool screw 34 that is screwed through each screw aperture 12 of the lathe mount 10, the first end of the tool mount 30a defines a cutting tool notch 36 that runs perpendicular to the tool mount channel 32, adjacent to the first end 30a a pair of tool notch screw apertures 37 are linearly positioned so that each aperture 37 abuts the cutting tool notch 36; and a cutting tool 38, the cutting tool 38 is secured within the cutting tool notch 36 by cutting tool screws 39 that are screwed on to the tool notch screw apertures 37.

The embodiments of the present invention are made of steel.

The cutting tool of the present invention might comprise of diamond round material.

In preferred embodiments of the present invention, the lathe mount is 12 inches long, the tool mount is 8 inches in length.

While the inventor's above description contains many specificities, these should not be construed as limitations on the scope, but rather as an exemplification of several preferred embodiments thereof. Many other variations are possible. For example, the lathe tool 10 could be utilized for surfacing brake discs and other various discs, only requiring the brake discs to be flipped. Accordingly, the scope should be determined not by the embodiments illustrated, but by the appended claims and their legal equivalents.

What is claimed is:

1. A flywheel reconditioning tool that works in conjunction with a lathe, the reconditioning tool comprises of:
A lathe mount that is cylindrical, the lathe mount is inserted and secured to the lathe via a lathe mount screw, the lathe mount has a first and a second end, adjacent to the first end a channel is defined that runs along the length of the lathe mount for a distance of at least 4.50 inches, and adjacent to the second end a through hole is defined, the through hole runs perpendicular to the channel, also adjacent to the second end at least a pair of screw apertures are defined, the screw apertures are centrally lined up and run parallel to the through hole;
A bracket that is mounted on the lathe mount at a position that is adjacent to the first end of the lathe mount, the bracket defining at least one securing tension screw that secures the bracket to the lathe mount and an adjuster screw, the adjuster screw runs parallel to the lathe mount when the bracket is mounted on the lathe mount, the bracket is a ring that surrounds the lathe mount;
A tool mount, the tool mount is cylindrical and has a first and a second end, the tool mount defines a channel that runs along the length of the tool mount and runs from the second end toward the first end, the first end of the tool mount is inserted and passed through the lathe mount through hole and is secured to the lathe mount by at least one tool screw that is screwed through each screw aperture of the lathe mount, the first end of the tool mount defines a cutting tool notch that runs perpendicular to the tool mount channel, adjacent to the first end a pair of tool notch screw apertures are linearly positioned so that each aperture abuts the cutting tool notch; and A cutting tool, the cutting tool is secured within the cutting tool notch by cutting tool screws that are screwed on to the tool notch screw apertures.

2. The flywheel reconditioning tool that works in conjunction with the lathe of claim 1, wherein the cutting tool comprises diamond round and the tool is made of steel.

3. The flywheel reconditioning tool that works in conjunction with the lathe of claim 2, wherein the lathe mount is 12 inches long, the tool mount is 8 inches in length.

\* \* \* \* \*